Oct. 4, 1955 O. R. MEACHEN 2,719,878

ALARM CIRCUIT FOR TIMED IMPULSE SUPPLY CONDUCTORS

Filed July 14, 1954

INVENTOR
O. R. MEACHEN
BY R. O. Covell
ATTORNEY 2,719,878
Patented Oct. 4, 1955

2,719,878

ALARM CIRCUIT FOR TIMED IMPULSE SUPPLY CONDUCTORS

Oren R. Meachen, Columbus, Ohio, assignor to American Telephone and Telegraph Company, a corporation of New York Application July 14, 1954, Serial No. 443,279

3 Claims. (Cl. 179—5)

Figures 1, 2:
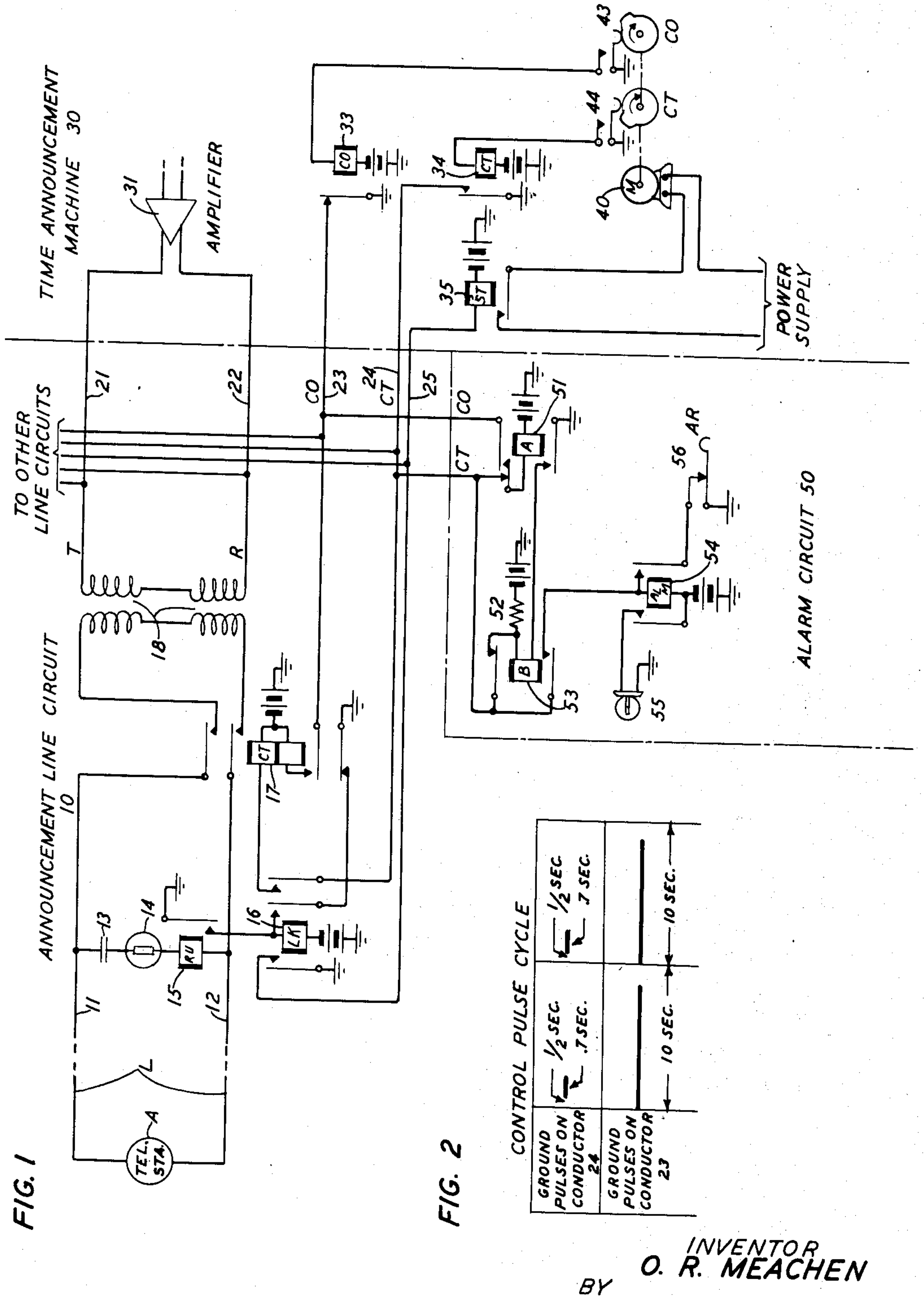

This invention relates to means for periodically supplying electrical control potential pulses over a pair of conductors for desired intervals and in desired sequence and particularly to the provision of means for giving an alarm in the case of failure of the supply of the potential pulses.

Objects of the invention are to insure the continued supply of control potential pulses in communication systems comprising announcement services, such as time-of-day announcement, and to facilitate maintenance of the potential pulse supply and distribution equipment in such systems.

The invention is a combination of electromagnetic relays connected to conductors which supply electrical potential pulses of desired duration and in desired sequence, the relays being effective to operate alarm means in case the required potential is not applied to one or more of these conductors for the required periods and sequence.

As applied to time-of-day announcement equipment comprising announcement line or trunk circuits, to each of which the output conductors of an announcement machine are connected and to each of which a calling subscriber line may be connected to receive a time-of-day announcement from the machine, the invention constitutes an alarm circuit unit connected to the pulse supply conductors of the machine which conductors are multipled to each of the announcement line circuits to effect the closing and opening of connections between calling subscriber lines and the outer circuit of the machine during the intervals between successive announcements, this alarm circuit being operative to continuously check the supply of the required potential pulses to the common supply conductors and to give an alarm in case the required potential is not applied in proper sequence and for the required periods to the pulse supply conductors.

A telephone system embodying the invention and its features is represented schematically in the drawing which consists of two figures.

Fig. 1 shows a system comprising telephone subscriber stations and lines, announcement line circuits 10 and a time-of-day announcement machine 30; and Fig. 2 illustrates the timing and duration of the ground potential pulses periodically applied by the announcement machine to the control conductors commonly connected to each of the announcement trunk circuits.

The announcement machine 30 which may be similar to that described in the patent to J. L. Franklin 2,011,216 granted August 13, 1935, is represented by an amplifier 31, which amplifies the time announcements reproduced from film records, the announcement supply conductors 21 and 22 being connected to the output of this amplifier. The announcement machine 30 also includes means for applying ground potential pulses through supply conductors 23 and 24 to each of the announcement line circuits served by the machine 30. The potential pulse supply means comprises a start relay 35 energized to start the operation of the announcement machine whenever a call is extended to any one of the associated group of announcement lines, an electrical motor 40 the electrical power for which is applied by operation of start relay 35, two cams designated CO and CT mounted on a shaft driven by the motor 40, contact springs 43 controlled by cam CO, contact springs 44 controlled by cam CT, a relay 33 controlled by springs 43 and a relay 34 controlled by springs 44. Relays 33 and 34 are thereby controlled to periodically supply ground potential pulses over conductors 23 and 24 for the desired intervals and in the proper sequence as illustrated in Fig. 2.

The telephone system represented in the drawing comprises subscriber stations and lines, including the station A and line L, and time-of-day announcement line circuits including the line circuit 10. The system includes switching equipment, which is represented by the broken lines between the conductors of line L and conductors 11 and 12 of the announcement line circuit 10, this switching equipment being employed in establishing connections between calling and called subscriber lines and also in connecting a subscriber line to an announcement line or trunk circuit when the subscriber makes a time-of-day call. The switching equipment may be manually operated or comprise any known type of dial controlled switches; and the telephone subscriber station, which is of usual type, includes a dial if the switching equipment is arranged for dial control.

The announcement line circuit 10 comprises a ring-up relay 15 bridged in series with condenser 13 and thermistor 14 across the incoming conductors 11 and 12, a locking relay 16, a cut-through relay 17 and repeating coil 18 having windings connected to the announcement supply conductors 21 and 22 which are common to other announcement line or trunk circuits. Upon connection of a calling subscriber line-to-line circuit 10, ringing current is applied to the line in usual and well-known manner, and relay 15 is operated by the ringing current. While operated, relay 15 closes a circuit for operating relay 16. Relay 16 locks under the control of cut-through relay 17 and connects ground to start conductor 25 to start the operation of the announcement machine, if not already in operation due to the connection of ground to start conductor 25 by some other line circuit in the group common to announcement machine 30. As soon, after relay 16 of an announcement line circuit 10 is operated, as ground potential is connected to supply conductor 24 by the operation of relay 34 of the announcement machine, relay 17 of line circuit 10 operates, closing the announcement connection between the calling line and the output of amplifier 31. The operation of relay 17 also causes the release of relay 16. At the time that relay 34 operates, relay 33 is not operated and ground potential is also being supplied to conductor 23; so that relay 17 locks through its lower winding to ground on pulse supply conductor 23. The ground potential is removed from supply conductor 24 when relay 34 releases, about .7 second after its operation; but relay 17 is held operated until ground is disconnected from supply conductor 23, by operation of relay 34, after sufficient time has elapsed for a time announcement to have been transmitted to the calling subscriber connected to line circuit 10. The operation of relay 33 and disconnection of ground potential from supply conductor 23 causes the release of relay 17, thereby opening the announcement connection through line circuit 10.

If start relay 35 is held operated by a call through some other one or more of the announcement line circuits common to machine 30, the cycle of operations of relays 33 and 34 is repeated. Thus announcement connections are completed through announcement line circuits to which calling lines are connected during the intervals between successive time announcements as controlled by the periodical connection of ground potential to pulse supply conductors 23 and 24.

The alarm circuit 50 comprises relays 51, 53 and 54, a resistor 52, a lamp 55 and an alarm release key 56. Relay 51 operates each time ground is connected to pulse supply conductor 24; and it locks to ground potential then being applied to pulse supply conductor 23. Thus relay A simulates the operation of relay 17 of line circuit 10, after a call is extended to line circuit 10. The operation of relay 51 closes a circuit including resistor 52 and the winding of relay 53; but, as long as ground potential is connected to pulse supply conductor 24, the winding of relay 53 is short-circuited and this relay does not operate. During normal operation relay 53 operates when ground is disconnected from pulse supply conductor 24; and relay 51 releases when ground is disconnected from supply conductor 23, thereby causing the release of relay 53 so that the alarm control relay 54 is not operated. In case ground is not disconnected from pulse supply conductor 23 at the end of the pulse cycle, relays 51 and 53 are held operated and the reconnection of ground to pulse supply conductor 24 causes operation of alarm relay 54 and the consequent lighting of alarm lamp 55. The alarm relay 54 locks under the control of key 56 independent of relays 51 and 52 and conductors 23 and 24. With relay 53 released, the operation of key 56 causes the release of alarm relay 54 and deenergization of alarm lamp 55.

The alarm control relay 54 is also operated in the case of a false connection of ground to conductor 24 after relays 51 and 53 have operated and before ground is disconnected from conductor 23. And the permanent grounding of supply conductor 24, after relay 53 has been operated, also causes the alarm to be operated. Whenever such trouble conditions occur the lighting of the alarm lamp indicates the need for immediate maintenance attention.

The alarm lamp represents any known type of electrically operated alarm device. Instead of locking relay 54 under control of key 56, the key may be omitted; in which case the locking armature contact of relay 54 may be connected to conductor 23, so that relay 54 is released as soon as ground is disconnected from conductor 23.

The invention is not limited in its application to the specific control pulse supply arrangement disclosed in the drawing but is generally applicable to any control impulse supply arrangement comprising a pair of conductors to which control potentials are periodically applied for desired intervals and in a desired sequence.

What is claimed is:

1. In combination, a first pulse supply conductor having periodically applied thereto relatively long ground potential pulses with a short interval between succeeding pulses, another pulse supply conductor having periodically applied thereto relatively short ground potential pulses with a long interval between succeeding pulses, each short pulse applied to said other supply conductor beginning a short interval after the beginning of each long pulse applied to said first supply conductor, a first relay normally connected to said other supply conductor for operation by a short ground potential pulse applied thereto, means for locking said first relay operated under control of the long ground potential pulse then being applied to said first supply conductor and for disconnecting said relay from said other supply conductor, another relay, an operating circuit for said other relay closed as long as said first relay is operated, means including normally closed contacts of said other relay for preventing operation of said other relay as long as ground potential continues to be applied to said other supply conductor, and an alarm control relay operated responsive to a second application of ground potential to said other supply conductor while said other relay is operated.

2. In combination with pulse supply conductors to each of which potential pulses are applied periodically, one pulse to each supply conductor in each succeeding like period of time, the pulses applied to one supply conductor being relatively short with respect to the pulses applied to another supply conductor, each potential pulse applied to said one supply conductor beginning a short interval of time after the beginning of each potential pulse applied to said other supply conductor, a first relay normally connected to said other supply conductor for operation by the next succeeding potential pulse applied thereto, means comprising contacts of said relay for connecting said relay to said one supply conductor and disconnecting said relay from said other supply conductor, another relay, a circuit including the winding of said other relay and contacts of said first relay, means including normally closed contacts of said other relay short-circuiting the winding of said other relay to prevent its operative energization while a potential pulse is being applied to said other supply conductor, an alarm control relay, and circuit means including contacts closed by operation of said other relay for operating said alarm control relay upon application of the pulse potential to said other supply conductor while said other relay is operated.

3. In a telephone system comprising subscribers' lines and switching means for interconnecting calling and called lines, announcement line circuits individually connected to each of a group of subscribers' lines, an announcement machine common to said announcement line circuits, said machine including means for periodically transmitting time-of-day announcements and including ground potential pulse supply conductors for controlling the operation of said announcement line circuits, one of said supply conductors supplying relatively long ground potential pulses with a short interval between succeeding pulses, another of said supply conductors supplying relatively short ground potential pulses with a long interval between succeeding pulses, each short pulse applied to said other supply conductor beginning a short interval after the beginning of each long pulse applied to said one supply conductor, means in each announcement line circuit operated by the next succeeding pulse applied to said other supply conductor for completing an announcement connection therethrough from said machine and for maintaining said connection under control of the corresponding pulse applied to said one supply conductor, a first relay normally connected to said other supply conductor for operation by each ground potential pulse applied thereto, means for locking said first relay operated until the corresponding ground potential pulse applied to said one supply conductor terminates and for disconnecting said relay from said other supply conductor, another relay, an operating circuit for said other relay closed by and during the operation of said first relay, means including normally closed contacts of said other relay short-circuiting said other relay to prevent its operation until the ground potential pulse applied to said other supply conductor terminates, and an alarm control relay operated responsive to a second application of ground potential to said other supply conductor while said other relay is operated.

References Cited in the file of this patent

UNITED STATES PATENTS 2,207,855 Franklin .............. July 16, 1940